United States Patent
Beer et al.

(10) Patent No.: US 6,344,491 B1
(45) Date of Patent: Feb. 5, 2002

(54) METHOD FOR OPERATING A FISCHER-TROPSCH PROCESS USING A HIGH PRESSURE AUTOTHERMAL REACTOR AS THE PRESSURE SOURCE FOR THE PROCESS

(75) Inventors: Gary L. Beer, Plano; Michael D. Briscoe, McKinney, both of TX (US)

(73) Assignee: Syntroleum Corporation, Tulsa, OK (US)

( * ) Notice: Subject to any disclaimer, the term of this patent is extended or adjusted under 35 U.S.C. 154(b) by 0 days.

(21) Appl. No.: 09/397,166

(22) Filed: Sep. 16, 1999

(51) Int. Cl.$^7$ ............................................. C07C 27/00
(52) U.S. Cl. ...................... 518/715; 518/702; 518/703; 518/700
(58) Field of Search ................................ 518/715, 702, 518/703, 700

(56) References Cited

U.S. PATENT DOCUMENTS 5,023,276 A * 6/1991 Yarrington et al. ......... 514/703
5,028,634 A 7/1991 Fiato ......................... 518/707

OTHER PUBLICATIONS

Hansen et al, High pressure autothermal reforming, Stud. Surf. Sci. Catal. (1998), 119, 875–882.*

"Production of Diesel Oil and Wax by Fischer–Tropsch–Synthesis using a Nitrogen–Rich Synthesis Gas—Investigations on a Semi–Technical Scale," by A. Jess, R. Popp and K. Hedden, 113, Jahrgang, Heft 12, Dec. 1997.

"Kinetics of the Fischer–Tropsch–Synthesis using A Nitrogen–Rich Synthesis Gas," by T. Kuntze, K. Hedden and A. Jess, OIL GAS—European Magazine Jan. 1995.

"Production of Synthesis Gas by Catalytic Partial Oxidation of Methane with Air," by A. Jess and K. Hedden, OIL GAS—European Magazine 20, Mar. 1994.

"A New Concept for the Production of Liquid Hydrocarbons from Natural Gas in Remote Areas," by K. Hedden, A. Jess and T. Kuntze, OIL GAS—European Magazine Mar. 1994.

"Synthesis Gas Production Via Catalytic Partial Oxidation of Methane with Air" presented Jun. 29, 1991, by Andreas Jess.

* cited by examiner

Primary Examiner—Johann Richter
Assistant Examiner—J. Parsa
(74) Attorney, Agent, or Firm—Baker Botts L.L.P.

(57) ABSTRACT

A method for producing a synthesis gas from a light hydrocarbon stream using air or oxygen-enriched air as an oxidant in a high pressure autothermal reactor and converting the synthesis gas in a Fischer-Tropsch process using a supported cobalt catalyst to produce heavy paraffins wherein the required process pressure is supplied by charging the reactant streams to the autothermal reactor at a high pressure.

4 Claims, 1 Drawing Sheet

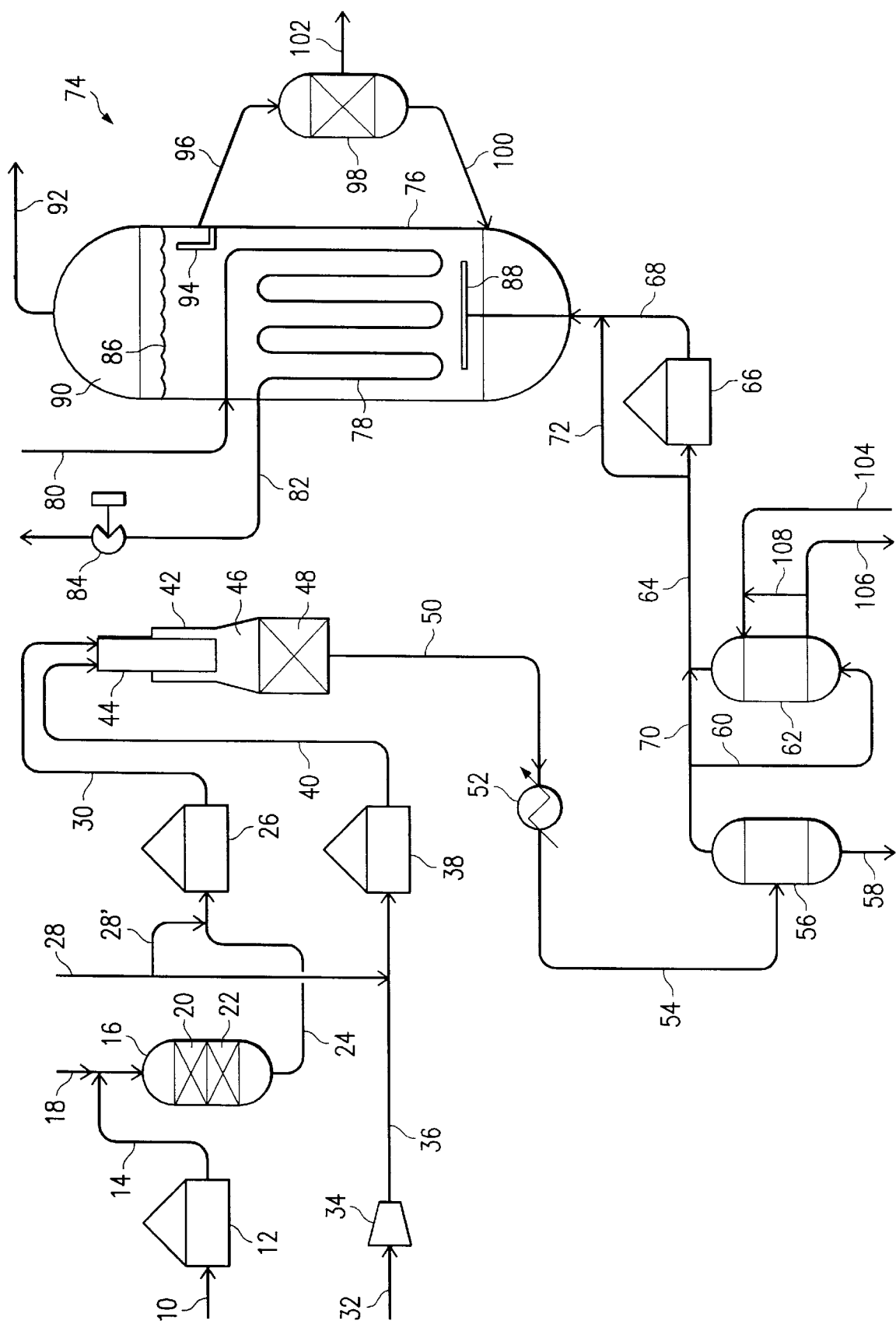

METHOD FOR OPERATING A FISCHER-TROPSCH PROCESS USING A HIGH PRESSURE AUTOTHERMAL REACTOR AS THE PRESSURE SOURCE FOR THE PROCESS

FIELD OF THE INVENTION

This invention relates to the production of heavy paraffins from synthesis gas in a Fischer-Tropsch reactor using a supported cobalt catalyst. The synthesis gas is produced by partial oxidation of a light hydrocarbon stream in an autothermal reactor wherein the reactant streams to the autothermal reactor are charged to the autothermal reactor at a pressure sufficient to supply process pressure for the entire synthesis gas production process and the Fischer-Tropsch synthesis process.

BACKGROUND OF THE INVENTION

Fischer-Tropsch processes are well known for use in converting synthesis gas, i.e., a mixture of carbon monoxide and hydrogen, into higher hydrocarbon products. Processes for the production of lighter fuels, such as jet fuel, diesel fuel, gasoline and the like are well known as are processes for the production of heavier paraffins. A variety of catalysts are used in such processes. Particularly, supported iron catalysts have been used for the production of light hydrocarbon fuels. More recently, supported cobalt catalysts have been used to produce liquid paraffins from synthesis gas in Fischer-Tropsch processes.

A continuing problem with Fischer-Tropsch processes is the production of the liquid hydrocarbon fuels at a competitive price. Accordingly, a continuing effort has been directed to the development of more economical methods for producing hydrocarbon fuels by Fischer-Tropsch processes.

In recent years, slurry bubble column reactors which utilize finely divided catalyst which is frequently cobalt, ruthenium or combinations thereof supported on an inorganic oxide such as alumina, titania, silica, silica alumina or the like have been utilized. The catalyst in such processes is finely divided and is maintained in suspension in a slurry comprising a liquid comprising reaction products, the finely divided catalyst particles and gas bubbles comprising synthesis gas by upward movement of synthesis gas bubbles and optimally recycle liquid into or through the slurry.

In all such processes, it is necessary that the synthesis gas be produced from some hydrocarbon fuel. Synthesis gas has been produced in the past from fuels as varied as coal, residual oils, and light hydrocarbon streams such as natural gas and other light hydrocarbons as heavy as benzene.

Commonly, the synthesis gas is produced from methane or natural gas by processes such as steam reforming or the use of autothermal reactors. Autothermal reactors typically have used a burner wherein the light hydrocarbon stream is partially combusted using air or oxygen-enriched air in combination with steam. The steam has been required to prevent the formation of soot and the like. The partially oxidized light hydrocarbon stream is then passed through a reforming catalyst bed, which may comprise nickel on alumina, where it reaches equilibrium to produce a synthesis gas mixture comprising carbon monoxide and hydrogen. Such processes are considered to be well known to those skilled in the art.

In a series of papers, "Production of Diesel Oil and Wax by Fischer-Tropsch-Synthesis using a Nitrogen-Rich Synthesis Gas-Investigations on a Semi-Technical Scale," by A. Jess, R. Popp and K. Hedden, 113, Jahrgang, Heft 12, December 1997; "Kinetics of the Fischer-Tropsch-Synthesis using A Nitrogen-Rich Synthesis Gas," by T. Kuntze, K. Hedden and A. Jess, OIL GAS—European Magazine January 1995; "Production of Synthesis Gas by Catalytic Partial Oxidation of Methane with Air," by A. Jess and K. Hedden, OIL GAS—European Magazine April 1994; "A New Concept for the Production of Liquid Hydrocarbons from Natural Gas in Remote Areas," by K. Hedden, A. Jess and T. Kuntze, OIL GAS—European Magazine March 1994; and, in a dissertation entitled "Synthesis Gas Production Via Catalytic Partial Oxidation of Methane with Air" presented Jun. 29, 1991, by Andreas Jess, a study of Fischer-Tropsch processes is presented. In this study, various methods for producing synthesis gas are discussed. The autothermal reactor is operated at an elevated pressure. The resulting synthesis gas is passed without the removal of water, ammonia, or other contaminants to a Fischer-Tropsch reactor in which it is reacted to produce fuels in the presence of an alkalized iron catalyst bed. Water is removed from the gaseous stream discharged from the Fischer-Tropsch reactor prior to charging the stream to a second Fischer-Tropsch reactor. These references disclose that the synthesis gas may be reacted in the Fischer-Tropsch reactor without further compression and have assumed that natural gas will be available at elevated pressure as a feed stream to the process.

Cobalt on a suitable support and in finely divided form has been used recently in slurry bubble column reactors to produce heavy paraffins. Such reactors tend to operate at higher pressures than the alkalized iron catalyst bed reactors used in the reference to produce light fuels such as, jet fuel, gasoline, diesel fuel, and the like. It is also desirable in such processes that, contrary to the references, the water resulting from the synthesis gas production be removed from the synthesis gas prior to charging it to the Fischer-Tropsch reactor.

Accordingly, a continuing search has been directed to the development of an improved method for producing heavy paraffins from a synthesis gas in a Fischer-Tropsch process using a supported cobalt catalyst wherein the process is pressurized by compressing a single reactant stream.

SUMMARY OF THE INVENTION

A method is provided for producing a synthesis gas from a light hydrocarbon stream using air or oxygen-enriched air as an oxidant in a high pressure autothermal reactor and converting the synthesis gas in a Fischer-Tropsch process using a supported cobalt catalyst to produce heavy paraffins wherein the required process pressure is supplied by charging the reactant streams to the autothermal reactor at a high pressure.

BRIEF DESCRIPTION OF THE DRAWING

The FIGURE is a schematic diagram of an embodiment of the process of the present invention.

DESCRIPTION OF THE PREFERRED EMBODIMENTS

The present invention comprises a method for producing a synthesis gas from a light hydrocarbon stream using air or oxygen-enriched air as an oxidant in a high pressure autothermal reactor and converting the synthesis gas in a Fischer-Tropsch process using a supported cobalt catalyst to produce heavy paraffins wherein the required process pressure is supplied by charging the reactant streams to the autothermal reactor at a high pressure. The method as shown in the FIGURE comprises:

(a) heating the light hydrocarbon stream to a temperature from about 600 to about 750° F.;

(b) passing the light hydrocarbon stream with added hydrogen to a desulfurization zone and contacting the light hydrocarbon stream with a suitable catalyst to convert sulfur contained in the light hydrocarbon stream into hydrogen sulfide;

(c) removing hydrogen sulfide from the light hydrocarbon stream and further heating the light hydrocarbon stream to a temperature from about 500 to about 900° F.;

(d) charging the light hydrocarbon stream to an autothermal reactor at a pressure from about 150 to about 500 pounds per square inch gauge (psig);

(e) compressing and heating the air or oxygen-enriched air stream to a temperature from about 500 to about 900° F. and a pressure from about 150 to about 500 psig;

(f) mixing the air or oxygen-enriched air and the hydrocarbon stream in a ratio suitable for substoichometric oxidation of the light hydrocarbon stream to produce synthesis gas;

(g) substoichimetrically oxidizing the light hydrocarbon stream in an autothermal reactor to produce the synthesis gas at a temperature from about 1500 to about 2000° F. and a pressure from about 150 to about 500 psig;

(h) cooling the synthesis gas to a temperature below about 150° F. and separating water from the cooled synthesis gas to produce a dried synthesis gas;

(i) converting at least a portion of the dried synthesis gas in a slurry bubble column Fischer-Tropsch reactor into a liquid heavy paraffin product stream and a gaseous stream comprising water, synthesis gas, light hydrocarbons and paraffins containing from about 5 to about 15 carbon atoms using a supported cobalt supported catalyst at a reactor temperature from about 400 to about 430° F. and a reactor pressure from about 150 to about 350 psig;

(j) recovering the liquid heavy paraffin product stream; and, (k) recovering the gaseous stream at a temperature from about 400 to about 430° F. and a pressure from about 150 to about 350 psig.

A light hydrocarbon stream, which may be methane, natural gas or any suitable light hydrocarbon, herein natural gas, is passed through a line 10 to a heater 12. In the embodiment shown, the light hydrocarbon stream in line 10 is an at least partially desulfurized natural gas which is heated in heater 12 to a temperature from about 600 to about 750° F. and then passed via a line 14 to a desulfurization unit 16. Desulfurization unit 16 includes a catalyst bed 20 which is typically a cobalt/molybdenum catalyst supported on a suitable inert carrier such as alumina. The desulfurization unit 16 will also contain a hydrogen sulfide absorbent 22, such as zinc oxide carried on a suitable carrier which may be zinc oxide. A variety of processes are known to those skilled in the art for removing sulfur from light hydrocarbons.

Hydrogen is supplied as necessary to the desulfurization unit 16 via a line 18. Typically the hydrogen is supplied in an amount roughly equivalent to 0.5 volume percent of the light hydrocarbon stream when the light hydrocarbon contains relatively small amounts of sulfur. In the embodiment shown, it is contemplated that a desulfurized natural gas stream which is available at a temperature of approximately 100° F. and approximately 400 pounds per square inch gauge (psig) will be charged to heater 12 through line 10. Other light hydrocarbons could be used, and if the light hydrocarbon stream used contains no sulfur then it is not necessary to desulfurize the light hydrocarbon stream. The desulfurized stream is then passed through a line 24 to a second heater 26 where it is heated to a temperature of about 500 to about 900° F. and passed through a line 30 to an autothermal reactor 42.

An air stream or a oxygen-enriched air stream, hereinafter referred to as air, is passed through a line 32 to a compressor 34 and compressed to a pressure from about 150 to about 500 psig. The compressed air is then passed through a line 36 to a heater 38 where it is heated to a temperature of about 500 to about 900° F. and then passes via a line 40 to autothermal reactor 42.

Steam may be mixed with either the natural gas, the air, or both via a line 28 and a line 28'. In the embodiment shown, the steam is added in an amount up to from about 0.25 to about 1.6 volumes of steam per volume of natural gas.

The air and natural gas are then passed into a mixing tube 44 positioned in an upper portion of autothermal reactor 42. The tube is sized to result in a linear gas flow velocity in tube 44 of at least about 50 feet per second. At this velocity, the air and natural gas mix to form a combustible mixture but do not ignite. The mixture passes via tube 44 into a reforming catalyst 48, which may be nickel on alumina, where the reactants flamelessly react to produce a gaseous stream comprising carbon monoxide, carbon dioxide, hydrogen, water and nitrogen. Desirably the gaseous mixture passes from tube 44 into catalyst bed 48 in less than the ignition lag period so that the substoichiometric reaction of the light hydrocarbon stream and the oxidant occurs in the upper part of catalyst bed 48. Desirably, the temperature in the upper portion of catalyst bed 48 is controlled to a maximum of about 2850° F. The ignition lag period refers to the time period between mixing the light hydrocarbon stream and the air to form a mixture and auto-ignition of the resulting mixture.

In catalyst bed 48, endothermic reactions occur as the partially oxidized light hydrocarbon stream equilibriates to form a synthesis gas mixture. The gaseous mixture discharged from autothermal reactor 42 through a line 50 is typically at a pressure of about 150 to about 500 psig and a temperature of about 1700 to about 2000° F. Typically, carbon conversions greater than about 85 percent can be achieved in such autothermal reactors at these reaction conditions. The synthesis gas typically contains hydrogen and carbon monoxide in hydrogen/carbon monoxide ratios from about 5:1 to about 1:1. For the production of heavy paraffins, a ratio of about 2:1 is preferred.

The synthesis gas stream in line 50 is passed to a heat exchanger 52 where it is cooled to approximately 150° F., and preferably about 100° F., at about 150 to about 500 psig and passed via a line 54 to a water separator 56 where water is separated and discarded via a line 58 or passed to use in the process. The gaseous stream is recovered via a line 60 and passed through line 60 to an ammonia scrubber 62 where it is counter-currently contacted with water supplied via a line 104 and recovered via a line 106. The water may be recycled via a line 108 if desired. Preferably, the water charged to scrubber 62 contains quantities of carbon dioxide so that the ammonia can be recovered as an ammonium carbonate stream. The ammonium carbonate can be concentrated in the recirculating stream by recycling the discharged water stream through line 108 to further use in scrubber 62. Optionally, ammonia scrubber 62 may be bypassed by passing the synthesis gas stream directly through a line 70 to a line 64 if sufficient quantities of ammonia have been removed in water separator 56. Alternatively, other cooling methods such as a water quench may be used. If sufficient water/gas contact is present in such methods at a suitable temperature, the ammonia may be removed in the water. Such cooling and gas treatment variations are considered to be well-known to those skilled in the art.

The synthesis gas passed either directly to line 64 or passed to line 64 from ammonia scrubber 62 is passed via a line 64 to a heater 66 where it may be heated to a temperature of about 500° F. at about 150 to about 500 psig and passed via a line 68 to a Fischer-Tropsch reactor 74.

When operation has been commenced in Fischer-Tropsch reactor 74, heating of the synthesis gas stream in line 64 may not be necessary and heater 66 may be bypassed via a line 72. The pressure losses in water separator 56 and ammonia scrubber 62 have been found to be small so that the pressure desired in Fischer-Tropsch reactor 74 can be supplied by compressing the light hydrocarbon stream, the air charged to autothermal reactor 42 or both. In the embodiment shown, the natural gas is available at an elevated pressure so only the air requires compression. If necessary the natural gas stream is also compressed prior to charging it to the autothermal reactor. The gaseous volume of the combined streams increases in autothermal reactor 42 by approximately 30 percent, therefore, charging these streams to the autothermal reactor at the elevated pressure provides the desired pressure for the process steps and represents a significant energy savings. It has now been found that subsequent operations required in the present method with the synthesis gas prior to charging it to the Fischer-Tropsch reactor can be accomplished without significantly reducing the pressure of the gaseous stream recovered from autothermal reactor 42.

Fischer-Tropsch reactor 74 comprises a vessel 76 which contains heat exchange tubes 78 which are supplied with water via a line 80 with steam being recovered through a line 82. The pressure on heat exchange tubes 78 is controlled by a back pressure valve 84 in line 82, so that the temperature in vessel 76 can be controlled. In vessel 76, a slurry level 86 is maintained near the top of the vessel. The slurry in Fischer-Tropsch reactor 74 comprises a supported cobalt catalyst in finely divided form. Typically the catalyst particles are less than about 100 microns in diameter and are present in the slurry in an amount equal to from about 10 to about 35 weight percent of the slurry. The catalyst is suspended in a slurry liquid which comprises primarily reaction products of the Fischer-Tropsch reaction, which is operated at a pressure from about 150 to about 350 psig and at a temperature from about 400 to about 430° F. The synthesis gas is passed through line 68 and through a sparger 88 or other suitable gas dispersion equipment to disperse the synthesis gas. Finely divided bubbles move upwardly through vessel 76 in contact with the slurry. A gas stream is recovered via a headspace 90 and through a line 92 and comprises a gaseous stream which comprises water, synthesis gas, light hydrocarbons, paraffins containing from about 5 to about 15 carbon atoms and the like. A liquid slurry stream is recovered from vessel 76 by removing de-gassed slurry from a weir 94, which is positioned near the top of vessel 76 but below slurry level 86. Slurry in the weir is able to de-gas since the gaseous bubbles passing upwardly through vessel 76 do not contact the slurry in weir 94. The de-gassed slurry is passed through a line 96 to a filter 98 where a product stream comprising heavy paraffins containing predominately more than 15 carbon atoms per molecule is recovered via a line 102. The remaining slurry is passed via a line 100 back to a lower portion of Fischer-Tropsch reactor 76. The stream in line 92 is typically recovered at a temperature from about 400 to about 430° F. and at a pressure from about 250 to about 350 psig. This stream will be at roughly the same pressure as the synthesis gas charged to the Fischer-Tropsch reactor, less pressure losses through the slurry in vessel 76. This stream may be passed to further processing to recover products, to recover water and remaining quantities of synthesis gas contained in the stream and the like. The product heavy paraffin stream recovered through line 102 is desirably passed to use as a product or the like. The remaining quantities of synthesis gas contained in the stream in line 92 are at a pressure sufficient for use in a second, and if required, a third Fischer-Tropsch reactor.

By the method of the present invention, the pressure necessary for the operation of the entire Fischer-Tropsch process has been supplied by charging the light hydrocarbon stream and the air to the autothermal reactor at an elevated pressure. The streams selected for compression have a volume which is about 75–80 percent of the volume of the synthesis gas stream produced in the autothermal reactor at comparable conditions of temperature and pressure.

When natural gas or other light hydrocarbons are not available for charging to the process via line 10 at a suitable elevated pressure, it may be necessary to compress this stream.

The invention has been described by reference to supported cobalt catalysts Various catalysts may be used as known to those skilled in the art in the Fischer-Tropsch reactor. Cobalt, ruthenium or a combination of cobalt and ruthenium supported on inorganic oxide carriers such as alumina, titania, silica, silica alumina and the like, as known to those skilled in the art, may be used. Further, the catalyst may contain promoters as known to those skilled in the art. A variety of catalysts are available for selection dependent upon whether the process is used to produce light hydrocarbon fuels, such as jet fuel, diesel fuel, gasoline, methanol, olefins, heavy paraffins or the like. Generally, when the Fischer-Tropsch process is used for the production of light hydrocarbon fuels, lower pressures are used in Fischer-Tropsch reactor 74. In such processes, it may not have been necessary to retain the pressure of the synthesis gas at the levels required in the method of the present invention since such processes operate at somewhat lower pressures in the Fischer-Tropsch reactor than similar processes for the production of heavy paraffins.

According to the present invention, a method has been provided for economically and efficiently providing a high pressure synthesis gas stream for use in a Fischer-Tropsch reactor so that the high pressure required in the entire process can be supplied by charging the reactant streams to the autothermal reactor at a pressure sufficient to achieve the desired pressure in Fischer-Tropsch reactor 74, and if desired in a subsequent Fischer-Tropsch reactor of a similar type. This represents a significant economical improvement in the operation of Fischer-Tropsch processes since a much lower volume of gas is compressed than if the synthesis gas stream were compressed.

Having thus described the present invention by reference to certain of its preferred embodiments, it is respectfully pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

We claim:

1. A method for producing a synthesis gas from a light hydrocarbon stream using air or oxygen-enriched air as a oxidant in an autothermal reactor and converting the synthesis gas in a Fischer-Tropsch process using a supported cobalt catalyst to produce heavy paraffins wherein the required process pressure is supplied by charging the reactant streams to the autothermal reactor at a high pressure, the method comprising:

a) heating the light hydrocarbon stream at a pressure from about 150 to about 500 psig to a temperature from about 500 to about 900° F.;

b) compressing and heating the oxidant to a temperature from about 500 to about 900° F. and a pressure from about 150 to about 500 psig;

c) charging the light hydrocarbon stream and the oxidant to the autothermal reactor at a pressure from 150 to about 500 psig;

d) mixing the oxidant and the light hydrocarbon stream;

e) substoichimetrically oxidizing the light hydrocarbon stream flamelessly in the autothermal reactor in a catalyst bed consisting essentially of nickel on alumina to produce the synthesis gas at a temperature from about 1500 to about 2000° F. and a pressure from about 150 to about 500 psig;

f) cooling the synthesis gas to a temperature below about 150° F. and separating water from the cooled synthesis gas to produce a dried synthesis gas at a pressure from about 150 to about 500 psig.

g) converting the dried synthesis gas in a slurry bubble column Fischer-Tropsch reactor into a liquid heavy paraffin product stream containing predominately greater than 15 carbon atoms per molecule and a gaseous stream comprising water, synthesis gas, light hydrocarbons and paraffins containing from about 5 to about 15 carbon atoms per molecule using a cobalt supported catalyst in finely divided form and comprising particles less than about 100 microns in diameter at a reactor temperature from about 400 to about 430° F. and a reactor pressure from about 150 to about 350 psig.

h) recovering the liquid heavy paraffin product stream; and, i) recovering the gaseous stream at a temperature from about 400 to about 430° F. and a pressure from about 150 to about 350 psig.

2. The method of claim 1 wherein the Fischer-Tropsch catalyst is cobalt supported on alumina.

3. The method of claim 1 wherein the hydrogen:carbon monoxide ratio in the synthesis gas is about 2:1.

4. The method of claim 1 wherein air is used as the oxidant and wherein the airstream is compressed.

* * * * *